United States Patent [19]

Pasternak et al.

[11] Patent Number: 4,898,674

[45] Date of Patent: Feb. 6, 1990

[54] SOLVENT DEWAXING PROCESS

[75] Inventors: Mordechai Pasternak, Spring Valley; Tansukhlal G. Dorawala, Wappingers Falls, both of N.Y.

[73] Assignee: Texaco Inc., White Plains, N.Y.

[21] Appl. No.: 172,663

[22] Filed: Mar. 24, 1988

[51] Int. Cl.$^4$ .............................................. B01D 13/00
[52] U.S. Cl. .................................... 210/638; 210/640; 210/500.36; 210/500.37
[58] Field of Search ............. 210/640, 500.36, 500.37, 210/490, 638; 54/27, 32

[56] References Cited

U.S. PATENT DOCUMENTS 4,670,146  6/1987  Inoue et al. ................ 210/500.36 X

*Primary Examiner*—Frank Spear
*Attorney, Agent, or Firm*—Robert A. Kulason; James J. O'Loughlin; Carl G. Seutter

[57] ABSTRACT

Solvent dewaxing of charge lubricating oil stocks requiring different ratios of methyl ethyl ketone to toluene is effected by adjusting the ratio of components in the dewaxing solvent by a membrane.

12 Claims, No Drawings

SOLVENT DEWAXING PROCESS

FIELD OF THE INVENTION

This invention relates to solvent dewaxing. More particularly it relates to a process for adjusting the ratio of methyl ethyl ketone to toluene in an MEK-toluene solvent which may be used to process different base stocks which are preferably dewaxed with MEK-toluene solvents of different ratios.

BACKGROUND OF THE INVENTION

As is well known to those skilled in the art, lubricating oil fractions recovered from atmospheric distillation or from vacuum distillation require further treatment before they can be used to formulate finished lubricating oils. The type and degree of treatment may vary depending on the composition of the fraction which may be derived, for example, from (i) a bright stock recovered as bottoms from vacuum distillation of a paraffinic crude or from (ii) a wax distillate recovered as a side cut from vacuum distillation of a paraffinic reduced crude or of an asphaltic reduced crude.

Further treatment of these lube oil stocks may include a wide variety of operations, such as dewaxing, solvent extraction, acid treatment, etc., to provide finished bright stocks or distillate lube oils.

Dewaxing, to remove wax from wax-bearing lube oil stocks, is carried out to provide a product which has improved cold weather properties, i.e. which does not precipitate wax under cold conditions, and which also may be characterized by improved viscosity, viscosity index, etc. MEK dewaxing is commonly carried out with a solvent containing toluene as the oil solvent and methyl ethyl ketone as the wax antisolvent.

It is important to control the ratio of MEK to toluene and to be able to adjust this ratio, since it allows utilization of the optimum concentrations for processing various base stocks. Commonly a ratio of 0.7:1 to 1:1, say 1 (i.e. 1:1) may be used when processing bright stocks; and a ratio of 1.2:1 to 2.3:1, say 2 (i.e. 2:1) may be used when processing light stocks.

Alternatively expressed, bright stock may be dewaxed with solvent typically ranging from 70:30 to 50:50, while light stock may utilize 40:60 to 50:50 methyl ethyl ketone: toluene ratios. These ratios are weight ratios.

Clearly an operator of a single train dewaxing operation finds it desirable to be able to process a full range of lube oil feed stocks in that train; but this has heretofore required substantial additional capital and operating expense to adjust the ratio, as by distillation.

It is an object of this invention to provide a novel process for treating a charge mixture containing a charge ratio of oil solvent and wax antisolvent to obtain a product mixture containing a different ratio of oil solvent and wax antisolvent. Other objects will be apparent to those skilled in the art.

STATEMENT OF THE INVENTION

In accordance with certain of the aspects, this invention is directed to a process for treating a charge solution containing an organic oxygen-containing wax antisolvent and an aromatic hydrocarbon oil solvent in a charge ratio of organic oxygen-containing wax antisolvent to aromatic hydrocarbon oil solvent which comprises passing a charge solution containing an organic oxygen-containing wax antisolvent and an aromatic hydrocarbon oil solvent in a charge ratio of organic oxygen-containing wax antisolvent to aromatic hydrocarbon oil solvent into contact with, as non-porous pervaporation membrane, a high molecular weight ion exchange resin in membrane form having carbon atoms in the backbone bearing a pendant acid group which membrane has been contacted with, as a counter ion, a potassium salt or preferably a quaternary phosphonium salt containing hydrocarbyl groups each of which contains at least four carbon atoms;

maintaining a pressure drop across said pervaporation membrane thereby forming (i) a retentate containing decreased content of oxygen-containing wax antisolvent and (ii) a permeate containing increased content of oxygen-containing wax antisolvent; and recovering said retentate containing decreased content of oxygen-containing wax antisolvent and said permeate containing increased content of oxygen-containing wax antisolvent.

In accordance with certain of its other aspects, this invention is directed to a membrane which comprises a high molecular weight ion-exchange resin in membrane form having carbon atoms in the backbone bearing a pendant acid group, which membrane has been contacted with, as counter ion, a potassium salt or a quaternary phosphonium salt containing hydrocarbyl groups each of which contains at least four carbon atoms.

DESCRIPTION OF THE INVENTION

The wax-containing lubricating oil stocks which may be dewaxed by the process of this invention may be cuts falling within the lubricating oil boiling range obtained from distillation of paraffinic or asphaltic crude oils. Typical cuts may include, for example, (i) a wax distillate or light stock obtained from vacuum distillation of a reduced paraffinic crude, or (ii) a bright stock obtained as by deasphalting a vacuum bottoms derived from an asphaltic crude.

Although the wax content of the stock may vary widely depending on the nature of the crude from which it is distilled, the boiling point of the cut, and the details of subsequent processing, the typical bright stock charge to dewaxing may contain 2%–50%, say 20w% wax, while the typical wax distillate or light stock may contain 2 w%–50 w%, say 20 w% wax.

In practice of dewaxing, 100 parts of charge stock at 60° F.–200° F., say 80° F., may be mixed with 200,–600 parts, say 250 parts of dewaxing solvent and the mixture chilled to 30 ° F.–minus 20° F., say −15° F. in a double pipe chiller. Chilling is effected to a temperature which is a few degrees below the desired cold test of the product oil.

The dewaxing solvent which is employed contains an aromatic hydrocarbon oil solvent. Typically, this may be toluene or benzene or a mixture of the two. (Due to toxicity considerations, however, benzene is rarely used in this country at this time in dewaxing solvents.) Also present in the dewaxing solvent is an oxygen-containing wax antisolvent, typically a ketone such as methyl isobutyl ketone or more preferably methyl ethyl ketone (MEK).

When dewaxing a bright stock, the weight ratio of MEK to toluene may be 0.7:1 to 1:1 and it is common to use a dewaxing solvent containing equal parts by weight (i.e. a 1:1 ratio mixture) of methyl ethyl ketone and toluene. When dewaxing a wax distillate or light stock, the weight ratio of MEK to toluene may be 1.2:1 to 2.3:1 and it is common to use as dewaxing solvent a 2:1 ratio methyl ethyl ketone-toluene mixture.

As the mixture of charge oil and dewaxing solvent is cooled, typically in an internally scraped double pipe chiller, wax precipitates from solution and a slurry is formed. The chilled slurry is passed to a filtration operation, typically effected in a rotary vacuum filter wherein precipitated wax is separated from the filtrate solution of dewaxed oil stock in dewaxing solvent.

The filtrate solution of dewaxed lube oil stock in dewaxing solvent is withdrawn from the filter and heated to distill off the dewaxing solvent; and the dewaxed oil is recovered.

When the dewaxing process is carried out to dewax a bright stock, the weight ratio of methyl ethyl ketone to toluene in the dewaxing solvent is commonly 1:1. It is common to maintain a large inventory of 1:1 solvent in storage. When it is desired to dewax a wax distillate or a light stock, it may be desirable to utilize a solvent having a ratio of 2:1. It is a feature of this invention in accordance with certain of its aspects that it may be possible to readily and economically convert the ratio of oxygen-containing wax antisolvent to aromatic hydrocarbon oil solvent in the dewaxing solvent to another ratio.

In typical operation, dewaxing of bright stock is carried out using the 1:1 ratio of dewaxing solvent which is taken from (and, when later recovered, is returned to) an inventory characterized by that ratio. When it is determined that the charge lube oil to be dewaxed will be switched to a light stock, then at a time sufficiently in advance of the switch to permit build up of desired inventory of solvent of modified ratio, the 1:1 ratio solvent will be pased to the membrane separation system of this invention. The membrane system will convert the 1:1 charge solvent into (i) a permeate containing a higher proportion of methyl ethyl ketone oxygenate wax antisolvent and a lower proporation of toluene aromatic oil solvent and (ii) a retentate containng a lower proportion of methyl ethyl ketone and a higher proporation of toluene.

As will be apparent, the particular degree of change will depend on the needs of the dewaxing operation. It may, for example, be desired to convert the 1:1 ratio used to dewax bright stock into a 2:1 ratio used to dewax light stock. In this case, membrane pervaporation is carried out to yield permeate which containe the 2:1 ratio; and the retentate would be characterized by a 1:2 ratio.

Conversion may be carried out until there is sufficient converted 2:1 ratio solvent to dewax the light stock. The undesired 1:2 ratio is store until needed q.v. infra.

Dewaxing of the stock requiring 2:1 ratio solvent may be continued until external conditions dictate the need to cease dewaxing the stock and go back to dewaxing the stock requiring the 1:1 ratio.

At this time, the desired 1:1 ratio solvent may be obtained by withdrawing from inventory the 1:2 ratio solvent (which had been removed from membrane operation as retentate) and mixing this with an equal weight of the 2:1 ratio solvent (recovered as permeate) which has been used for dewaxing of the bright stock.

Clearly the extent of the membrane separation (which is a function of the time of contact, may be varied to suit the needs of the refiner. For example, it may be desirable to convert a 1:1 charge to a 1.7:1 permeate—or alternatively to utilize a retentate which might contain a solvent having a ratio of say 0.9:1.

It will be apparent to those skilled in the art that this mode of operation permits a refiner to vary at will the properties (i.e. the ratio) of the solvent depending on the need by operating the membrane system e.g. at different temperatures, pressures, or times, to yield the desired ratio—or alternatively to mix different proportions of the permeate inventory with the retentate inventory to attain a solvent of desired ratio.

Treatment of the charge liquid containing an organic oxygen-containing wax antisolvent and an organic oil solvent may be effected by passing the charge liquid containing an organic oxygen-containing wax antisolvent and an organic oil solvent into contact with as a pervaporation membrane a high molecular weight ion exchange resin in membrane form which membrane has been contacted with, counter ion, a potassium salt or a quaternary phosphonium salt containing hydrocarbyl groups, each of which contains at least four carbon atoms;

maintaining a pressure drop across said pervaporation membrane thereby forming a retentate containing decreased content of organic oxygen-containing wax antisolvent and increased content of organic oil solvent and a permeate containing increased content of organic oxygen-containing wax antisolvent and decreased content of organic oil solvent;

recovering said retentate containing decreased content of organic oxygen-containing wax antisolvent and increased content of organic oil solvent; and recovering said permeate containing increased content of organic oxygen-containing wax antisolvent and decreased content of organic oil solvent.

The pervaporation membrane which may be utilized in practice of the process of this invention may be a high molecular weight ion exchange resin in membrane form. The membrane may be formed of a non-porous material such as polyolefin (e.g. polyethylene, polypropylene, polystyrene, copolymers of ethylene-propylene, terpolymers of ethylene-propylene-third monomer such as 1,4-hexadiene or dicyclopentadiene or ethylidene norbornene); vinyls such as polyvinyl chloride, polyvinyl acetate, etc., perfluorinated polyolefins, perfluorinated ether polymers, etc. Clearly the molecular weight of the membrane may vary depending on the species. The thickness of the membrane may typically be 80–190 microns.

The ion exchange resins which may be employed in membrane form are characterized by the presence of a pendant acid group such as a —COOH group or more preferably a —SO$_3$H group. These may be introduced into the resin in known manner (if not already present therein) by functionalization with appropriate reagents.

A preferred class of membranes may include those which are perfluorinated hydrocarbons or ethers (i.e. contain substantially no hydrogen atoms other than those on the pendant acid e.g. —SO$_3$H groups). These membranes may preferably be characterized by the following formula:

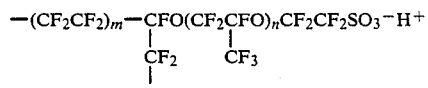

One acid resin membrane which is particularly preferred is that first set forth in the following table which lists illustrative commercially available ion exchange resin membranes which may be employed:

TABLE

A. The Nafion - H 117 brand of perfluorinated resin membrane made by DuPont of a thickness of 190 microns, and having a formula:

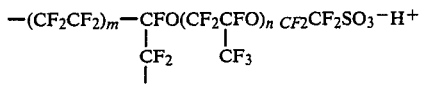

B. Sulfonated polyethylene

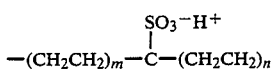

TREATMENT OF MEMBRANE

Treatment of the high molecular weight resin in membrane form bearing a pendant acid group to permit effective use in the process of this invention may include contacting the membrane with counter ions which may be derived from (i) a potassium salt or (ii) a quaternary phosphonium salt $R_4PX$ wherein R is a hydrocarbon moiety having at least four carbon atoms and X is preferably a halide, more preferably bromide. Treating to provide the counter ion may be carried out as by contacting at least the membrane surface, which is to contact the charge solution, with a solution of agent containing the counter ion.

The treating agent to provide the counter ion may typically be an aqueous solution of a salt of the cation - a halide, sulfate, etc. When the counter ion is potassium, typically the treating agent may be in the form of an aqueous solution of e.g. potassium chloride, etc.

When the treating agent is a quaternary phosphonium salt, it may be characterized by the formula $R_4PX$.

In the above compound, R may be a hydrocarbon selected from the group consisting of alkyl, aralkyl, cycloalkyl, aryl, and alkaryl, including such radicals when inertly substituted. When R is alkyl, it may typically be n-butyl, i-butyl, sec-butyl, amyl, octyl, decyl, octadecyl, etc. When R is aralkyl, it may typically be benzyl, beta-phenylethyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is alkaryl, it may typically be tolyl, xylyl, etc. R may be inertly substituted i.e. it may bear a non-reactive substituent such as alkyl, aryl, cycloalkyl, ether, etc. Typically inertly substituted R groups may include 3-ethoxypropyl, 2-ethoxyethyl, carboethoxymethyl, 4-methyl cyclohexyl, etc. The preferred R group may be phenyl.

The R groups may be different, although preferably they will be the same. X may be an anion such as sulfate or preferably a halide, preferably chloride or bromide---most preferably bromide. Typical quaternaries which may be employed (the first listed being preferred) may include:

TABLE tetra-n-butyl phosphonium chloride
tetra-i-butyl phosphonium bromide
tetrabutyl phosphonium fluoride etc.

The treating agent, potassium salt or quaternary salt, may be employed as a solution in water or alcohol, typically 5w%-50w%, say 10w% solution (corresponding to about 0.2 M) in solvent, typically an alcohol such as isopropyl alcohol. Contact may be at 25° C. for 12-48 hours, say 24 hours with mild agitation. Thereafter, the treated membrane may be washed 2-5, say 3 times for 10-50 minutes, say 30 minutes at 20° C.-40° C., say 25° C. with isopropanol followed by washes with a 50v/50v mixture of isopropanol and water and drying at 20° C.-40° C., say 25° C. for 5-20 minutes, say 10 minutes.

The membranes of this invention may be utilized in various configurations. It is, for example, possible to utilize the membrane in a plate-and-frame configuration in which the separating membrane layer may be mounted on a porous support layer.

In one preferred embodiment, it is possible to utilize the system of this invention as a tubular or hollow fibre. In this embodiment, the resin membrane may be extruded as a fine tube with a wall thickness of typically 0.001-0.1 mm. The extruded tube may be passed through a counter ion bath. A bundle of these tubes is secured (with an epoxy adhesive) at each end in a header; and the fibres are cut so that they are flush with the ends of the header. This tube bundle is mounted within a shell in a typical shell-and-tube assembly.

In operation, the charge liquid is admitted to the tube side and passes through the inside of the tubes and exits as retentate. During passage through the tubes, permeate passes through the non-porous separating membrane and permeate is collected in the shell side.

PERVAPORATION

It is a feature of the membrane of this invention that it is found to be particularly effective when used in a pervaporation process. In pervaporation, a charge liquid containing a more permeable and a less permeable component is maintained in contact with a non-porous separating membrane layer; and a pressure drop is maintained across that layer. A portion of the charge liquid dissolves into the membrane and diffuses therethrough. The permeate which passes through the membrane and exits as a vapor may be recovered by condensing at low temperature or alternatively may be swept away by use of a moving stream of gas. Preferably, the permeate side of the membrane is maintained at a low pressure, typically 1-10 mm. Hg.

For general background on pervaporation, note U.S. Pat. No. 4,277,344, U.S. Pat. No. 4,039,440; U.S. Pat. No. 3,926,798; U.S. Pat. No. 3,950,247; U.S. Pat. No. 4,035,291; etc.

It is a feature of this invention that the noted membrane may be particularly useful in pervaporation processes for solutions of organic oxygen-containing components typified by methyl ethyl ketone and hydrocarbons such as toluene.

A typical charge may contain equal parts by weight of methyl ethyl ketone and toluene, as is used in MEK dewaxing of a bright stock.

In practice of the pervaporation process of this invention, the charge solution at 25° C.-120° C., say 70° C. may be passed into contact with the non-porous membrane of this invention. A pressure drop of about one atmosphere is commonly maintained across the membrane. Typically, the feed or charge side of the membrane is at about atmospheric pressure and the permeate or discharge side of the membrane is at a pressure of about 0.5–50, preferably 0.5–20, say 5 mm.Hg.

The permeate which passes through the membrane includes increased concentration of MEK and decreased concentration of toluene. Typically, the retentate contains decreased content of MEK and increased content of toluene. Permeate is condensed and recovered in liquid phase.

Pervaporation may typically be carried out at a flux of 0.01–10, say 0.10 gallons per square foot per day which corresponds to about 0.017–16.9, say 0.14 kilograms per square meter per hour (kmh). Typically, the units may have a selectivity (measured in terms of w% oxygen-containing component in the permeate during pervaporation at 25°–70° C.) of up to about 70%.

The Separation Factor S or Sep which represents the ability of the membrane to recover desired oxygenate is calculated as follows:

$$S = \frac{\left(\frac{X_n}{X_m}\right)_p}{\left(\frac{X_n}{X_m}\right)_f}$$

wherein $X_n$ and $X_m$ are the weight fractions of oxygen-containing component and aromatic hydrocarbon respectively in the permeate (P) and the feed (F). A system showing no separation at all would have a Separation Factor of 1; and a system showing perfect 100% separation would have a Separation Factor of infinity. The process of the instant invention may commonly have a Separation Factor of about 2–5, typically 2–3, say about 2.5. Satisfactory operation appears to require a Separation Factor of at least about 2.

It will be apparent to those skilled in the art that the degree of concentration of oxygen-containing component in the permeate may be a function of several variables. Among these may be the composition of the membrane counter ion, the temperature and pressure of pervaporation, and the effective time of contact between the charge solution and the membrane or, alternatively expressed, the area of contact with the membrane.

For example it may be desirable in one embodiment to effect only a small increase in concentration of a soluble component or alternatively it may be desirable to augment the concentration substantially.

DESCRIPTION OF SPECIFIC EMBODIMENT

Practice of the process of this invention will be apparent to those skilled in the art from the following wherein, as elsewhere in this specification, all parts are parts by weight unless otherwise specified.

EXAMPLE I

In this example which represents the best mode of carrying out the process of this invention according to certain of its aspects, the charge lubricating oil to be dewaxed is a bright stock derived from a paraffinic crude. The bright stock contains 20 w% wax and is characterized by an ibp of 1100° F.

This bright stock (100 parts) is dewaxed by mixing with 400 parts of dewaxing solvent containing equal parts by weight of methyl ethyl ketone and toluene. The mixture is cooled to minus 15° F. in a double pipe chiller. The slurry of wax and oil is filtered at minus 15° F. to yield 78 parts of dewaxed oil having a pour point of minus 5° F.

The filtrate is passed to a dewaxed oil evaporator wherein it is heated to yield bottoms of dewaxed oil and overhead of 1:1 ratio dewaxing solvent which is passed to 1:1 solvent storage. From this 1:1 solvent storage, the solvent is withdrawn to be used when the charge oil is a bright stock.

When it is contemplated that a light stock (which utilizes a 2:1 ratio dewaxing solvent) is to be employed, the 1:1 ratio solvent is passed to pervaporation to convert it to a 2:1 ratio solvent.

The membrane employed is the DuPont Nafion-H 117 brand of (thickness of 190 microns) perfluorinated membrane prepared by copolymerizing tetrafluoroethylene and vinyl sulfonyl fluoride having the following structure:

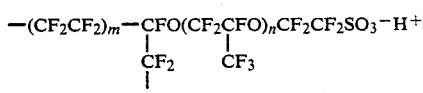

The surface of this membrane is exposed to 0.2 M tetraphenyl phosphonium bromide in isopropyl alcohol for 24 hours, followed by washing at 20° C. for 30 minutes with an excess of isopropanol and then with a 1 v:1 v isopropanol-water mixture, the washing steps being repeated two more times. The membrane is then equilibrated for 24 hours at 25° C. in a 1:1 MEK: toluene solution.

The membrane is mounted without support in a pervaporation unit. The feed to this unit is the 1:1 MEK : toluene dewaxing solvent at 70° C. Pervaporation occurs to yield substantially equal quantities of (i) permeate containing a 2:1 ratio of MEK : toluene and (ii) retentate containing a 1:2 ratio of MEK : toluene. The separation factor is 2.5 at a flux of 0.14 KMH.

The 2:1 permeate and the 1:2 retentate are each passed to separate inventories.

When it is desired to charge the light stock to the dewaxing operation in lieu of the bright stock, the supply of 1:1 MEK : toluene is shut off; and there is passed, as dewaxing solvent to be mixed with the light stock, the 2:1 ratio MEK : toluene permeate from the inventory thereof.

Clearly, when dewaxing the light stock with the 2:1 solvent in this embodiment, the solvent recovered from the dewaxed oil evaporation is not passed to the pervaporation step but rather to the 2:1 solvent inventory.

When it is desired to convert operations back to bright stock dewaxing (with 1:1 ratio solvent) this is most readily effected by mixing equal parts by weight of the 2:1 inventory and the 1:2 inventory.

It will be apparent to those skilled in the art that variations of this specific embodiment will be factored in. For example, in normal dewaxing of either the bright stock or the light stock, the dewaxing solvent is recovered and recycled to the charge. Thus it may be necessary to maintain an inventory of 1:1 solvent which is sufficiently large so that dewaxing of bright stock may be continued without recycle of 1:1 solvent in order to maintain the feed to pervaporation i.e. fresh solvent is employed. The converse is not a problem in this embodiment since permeate stream (2:1 ratio) and retentate stream (1:2 ratio) may always be readily mixed either as and when generated during pervaporation or from the separate inventories thereof.

It should also be noted of course that 1:1 solvent may be admitted directly to pervaporation in order to supply the needs of the light stock dewaxing operation.

EXAMPLES II–XXIII

In this series of Examples, flat sheets of Nafion-H 117 ion exchange membrane are exposed to 0.2 M solutions of counter-ion bearing salts dissolved in isopropanol for 24 hours. The treated membrane is then washed with isopropanol for thirty minutes and then with a 1:1 in mixture of isopropanol-water. The washing steps are repeated two more times.

The so treated membranes are allowed to equilibrate in 1:1 MEK - toluene feed and are then used in a pervaporation operation at 50° C. and 70° C. Separation Factor and Flux are measured.

A single asterisk designates a control example falling outside the scope of this invention. Experimental (i.e. within the scope of the invention) Examples XVI–XIX (designated by a double asterisk) utilize the Nafion 901 ion exchange membrane which contains both carboxyl an sulfonic groups.

TABLE

| Example | Counter-Ion | T °C. | Sep | Flux |
|---|---|---|---|---|
| II | P(phenyl)$_4$ | 50 | 2.8 | 0.07 |
| III | P(phenyl)$_4$ | 70 | 2.5 | 0.14 |
| IV | P(butyl)$_4$ | 50 | 3.1 | 0.02 |
| V | P(butyl)$_4$ | 70 | 2.8 | 0.04 |
| VI* | N(octyl)$_4$ | 50 | 1.3 | 0.4 |
| VII* | N(octyl)$_4$ | 70 | 1.3 | 0.7 |
| VIII* | N(hexyl)$_4$ | 50 | 1.5 | 0.4 |
| IX* | N(hexyl)$_4$ | 70 | 1.3 | 0.5 |
| X | K | 50 | 2.5 | 0.02 |
| XI | K | 70 | 1.5 | 0.1 |
| XII* | Cs | 50 | 1.4 | 0.04 |
| XIII* | Cs | 70 | 1.6 | 0.08 |
| XIV* | H | 50 | 1.9 | 0.004 |
| XV* | H | 70 | 1.4 | 0.006 |
| XVI** | P(phenyl)$_4$ | 50 | 3.2 | 0.04 |
| XVII** | P(phenyl)$_4$ | 70 | 2.1 | 0.08 |
| XVIII** | P(butyl)$_4$ | 50 | 2.6 | 0.01 |
| XIX** | P(butyl)$_4$ | 70 | 1.8 | 0.02 |

EXAMPLES XX*–XXIII*

In Examples XX*–XXI*, and XXII*–XXIII*, the control membranes employed are respectively (i) composite polyvinyl alcohol (PvA-1) supported on a polyacrylonitrile matrix and (ii) a commercially (the GFT 1178 membrane) available composite polyvinyl alchohol (PVA-2) supported on a polyacrylonitrile matrix.

TABLE

| Example | Membrane | T °C. | Sep | Flux |
|---|---|---|---|---|
| XX* | PVA-1 | 50 | 1.2 | 0.02 |
| XXI* | PVA-1 | 70 | 1.4 | 0.02 |
| XXII* | PVA-2 | 50 | 2.1 | 0.004 |
| XXIII* | PVA-2 | 70 | 2.0 | 0.005 |

From the above tables, the following conclusions may be drawn:

1. All the systems of this invention (I–V and X–XI and XVI–XIX) yield satisfactory results as measured by Separation Factor and by Flux.

2. Best results are attained by the use of the phenyl and butyl phosphonium counter ions.

3. Operation at 50° C. (rather than 70° C.) generally gives better Separation Factor although a lower Flux.

4. Operations outside the scope of this invention (VI*–IX*, and XII*–XV*, and XX*–XXII*) yield undesirable low Flux and/or Separation Factors. Examples XIV*, XXII*, and XXIII* in particular yield reasonable Separation Factor but the Flux is too low to be reasonably likely to be of interest.

Although this invention has been illustrated by reference to specific embodiments, it will be apparent to those skilled the art that various charges and modifications may be made which clearly fall within the scope of the invention.

We claim:

1. A process for treating a charge solution containing an organic oxygen-containing wax antisolvent and an aromatic hydrocarbon oil solvent in a charge ratio of organic oxygen-containing wax antisolvent to aromatic hydrocarbon oil solvent which comprises passing a charge solution containing an organic oxygen-containing wax antisolvent and an aromatic hydrocarbon oil solvent in a charge ratio of organic oxygen-containing wax antisolvent to aromatic hydrocarbon oil solvent into contact with, as non-porous pervaporation membrane, a high molecular weight ion exchange resin in membrane form having carbon atoms in the backbone bearing a pendant acid group which membrane has been contacted with as counter ion, a potassium salt or with a quaternary phosphonium salt containing hydrocarbyl groups;

maintaining a pressure drop across said pervaporation membrane thereby forming (i) a retentate containing decreased content of oxygen-containing wax antisolvent; and recovering said retentate containing decreased content of oxygen-containing wax antisolvent and said permeate containing increased content of oxygen-containing wax antisolvent.

2. A process as claimed in claim 1 wherein said oxygen-containing wax antisolvent is a ketone.

3. A process as claimed in claim 1 wherein said oxygen-containing wax antisolvent is methyl ethyl ketone.

4. A process as claimed in claim 1 wherein said aromatic hydrocarbon oil solvent is toluene.

5. A process as claimed in claim 1 wherein said charge ratio is 0.7:1–1:1.

6. A process as claimed in claim 1 wherein said charge ratio is about 1:1.

7. A process as claimed in claim 1 wherein said charge solution contains methyl ethyl ketone and toluene.

8. A process as claimed in claim 1 wherein said charge solution contains methyl ethyl ketone and toluene in weight ratio of about 1:1.

9. A process as claimed in claim 1 wherein said quaternary phosphonium salt is a tetraphenyl phosphonium salt.

10. A process as claimed in claim 1 wherein said quaternary phosphonium salt is a tetrabutyl phosphonium salt.

11. A process for treating a charge solution containing methyl ethyl ketone and toluene in a charge ratio of methyl ethyl ketone to toluene which comprises passing a charge solution containing methyl ethyl ketone and toluene in charge ratio of methyl ethyl ketone to toluene into contact with, as non-porous pervaporation membrane, a perfluorinated hydrocarbon or a perfluorinated ether which contains no hydrogen groups except those on a pendant acid group which membrane has been contacted with, as counter ion, a potassium salt or a tetrabutyl phosphonium salt or tetraphenyl phosphonium salt; maintaining a pressure drop across said pervaporation membrane thereby forming (i) a retentate containing decreased content of methyl ethyl ketone and (ii) a permeate containing increased content of methyl ethyl ketone; and recovering said retentate containing decreased content of methyl ethyl ketone and said permeate containing increased content of methyl ethyl ketone.

12. A process as claimed in claim 1 wherein each of the hydrocarbyl groups in said quaternary phosphonium salt contains at least four carbon atoms.

* * * * *